United States Patent
Jo et al.

(10) Patent No.: US 9,793,521 B2
(45) Date of Patent: Oct. 17, 2017

(54) POUCH TYPE RECHARGEABLE BATTERY (71) Applicant: Samsung SDI Co., Ltd., Yongin-si, Gyeonggi-do (KR)

(72) Inventors: Doo-Hyun Jo, Yongin-si (KR); Jeong-Ho Park, Yongin-si (KR); Kyung-Mo Yoo, Yongin-si (KR); Jung-Man Son, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 128 days.

(21) Appl. No.: 14/291,695

(22) Filed: May 30, 2014

(65) Prior Publication Data
US 2015/0056497 A1    Feb. 26, 2015

(30) Foreign Application Priority Data

Aug. 22, 2013    (KR) .................. 10-2013-0099714

(51) Int. Cl.
*H01M 2/06* (2006.01)
*H01M 2/02* (2006.01)

(52) U.S. Cl.
CPC ............ *H01M 2/06* (2013.01); *H01M 2/021* (2013.01); *H01M 2/0267* (2013.01); *H01M 2/0287* (2013.01); *H01M 2220/30* (2013.01)

(58) Field of Classification Search
USPC ............................................... 429/175–186
See application file for complete search history.

(56) References Cited

U.S. PATENT DOCUMENTS

| 7,122,276 | B2 * | 10/2006 | Gu .................. H01M 2/021 429/162 |
| 2010/0310930 | A1 | 12/2010 | Park et al. |
| 2012/0148888 | A1 | 6/2012 | Yun |

FOREIGN PATENT DOCUMENTS

| KR | 10-2010-0016719 | 2/2010 |
| KR | 10-2012-0066496 | 6/2012 |

OTHER PUBLICATIONS

Extended European Search Report dated Dec. 22, 2014 in corresponding European Application No. 14181824.5-1360.

* cited by examiner

*Primary Examiner* — Osei Amponsah
(74) *Attorney, Agent, or Firm* — Knobbe Martens Olson & Bear LLP (57) ABSTRACT

A pouch-type rechargeable battery includes an electrode assembly performing charging and discharging, a pouch forming a sealing portion at a side surface of a cell body receiving the electrode assembly by sealing an outer portion thereof and forming a terrace drawing out a first lead tab and a second lead tab connected to the electrode assembly at the other side surface of the cell body, and an insulation tape insulating the sealing portion from the cell body and including a short circuit check hole adjacent to the end of the terrace. The insulation tape insulates both side ends of the end.

6 Claims, 9 Drawing Sheets

POUCH TYPE RECHARGEABLE BATTERY

RELATED APPLICATIONS

This application claims priority to and the benefit of Korean Patent Application No. 10-2013-0099714 filed in the Korean Intellectual Property Office on Aug. 22, 2013, the entire contents of which are incorporated herein by reference.

BACKGROUND

Field

The described technology relates generally to a pouch type rechargeable battery with a sealing portion of a pouch insulated by an insulation tape.

Description of the Related Technology

With the development of mobile devices, demand for rechargeable batteries as an energy source has increased. In addition, high-energy, down-sized, light, and slim mobile devices have been required. For example, a rechargeable battery is flatly formed using a polymer solid electrolyte film. As the rechargeable battery, there is a pouch-type battery effectively implementing the slimness of the battery.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

The present disclosure provides a pouch type rechargeable battery with improved adhesion performance and insulation performance of an insulation tape in a sealing portion of a pouch and a terrace end.

A pouch type rechargeable battery according to an embodiment includes: an electrode assembly; a cell body configured to receive the electrode assembly; a pouch comprising: a sealing portion at a first side surface of the cell body formed by sealing an outer portion thereof, and a terrace configured to draw out a first lead tab and a second lead tab connected to the electrode assembly at a second side surface of the cell body; and an insulation tape insulating the sealing portion from the cell body and including a short circuit check hole adjacent to an end of the terrace, wherein the insulation tape insulates both side ends of the end of the terrace.

The terrace may include a bottom portion connected to a bottom of the cell body, and a side wall portion bent at the bottom portion and connected to the sealing portion.

The side wall portion of the terrace may include an end.

The insulation tape may include a first portion insulating a side end of the sealing portion, a second portion connected vertically to the first portion and insulating a side end of the bottom portion, and a third portion connecting the first portion and the second portion to each other and insulating side ends of the side wall portion.

A first center line CL1 of the first portion may cross the side end of the sealing portion, a second center line CL2 of the second portion may cross the side end of the bottom portion, and a cross point P where the first center line and the second center line are extended may be positioned at the third portion thereby according with a vertex of the side wall portion.

The first center line may cross a center of the short circuit check hole.

In the third portion, a first distance in the first center line direction between the short circuit check hole and the cross point may be larger than a second distance in the direction between the ends of the cross point and the third portion.

The third portion may include a wide width portion connected vertically to the first portion and the second portion, and a narrow width portion connected to the wide width portion and the second portion.

The insulation tape may be bent to insulate the side end of the sealing portion by the first portion and to insulate one side end of the side wall portion by the third portion, and may be bent to insulate the side end of the bottom portion and the other side end of the side wall portion by the second portion and to insulate the side end connected to the other side end of the side wall portion by the third portion.

The sealing portion and the terrace of the pouch are insulated by the insulation tape, and the insulation tape insulates both sides of the end of the terrace (the side wall portion) such that insulation performance is improved at the end of the terrace (the side wall portion). By forming the insulation tape formed of the first, second, and third portions, the first and second bends are firstly and secondly performed and the insulation tape is adhered to the end of the sealing portion and the terrace (the side wall portion) such that adhesion performance of the insulation tape may be improved.

DETAILED DESCRIPTION OF CERTAIN INVENTIVE EMBODIMENTS

The present invention will be described more fully hereinafter with reference to the accompanying drawings, in which certain embodiments of the invention are shown. As those skilled in the art would realize, the described embodiments may be modified in various ways, without departing from the spirit or scope of the present invention. The drawings and description are to be regarded as illustrative in nature and not restrictive. Like reference numerals generally designate like elements throughout the specification.

The pouch type rechargeable battery insulates a pouch sealing portion by an insulation tape and adheres it to a side of a cell body. The pouch type rechargeable battery forms a terrace from a side of a lead tab drawn out of the cell body to the sealing portion of the pouch. Accordingly, the insulation tape insulates the end of the terrace to prevent a short circuit of the end (an exposed metal portion) of the terrace.

The insulation tape includes short circuit check holes such that the insulation tape is adhered with several bends in the end of the terrace. However, the short circuit check hole is adjacent to the end of the terrace such that the insulation tape may be separated by a spring back phenomenon near the short circuit check hole. Accordingly, the insulation performance of the end of the terrace may be deteriorated.

Figure 1:
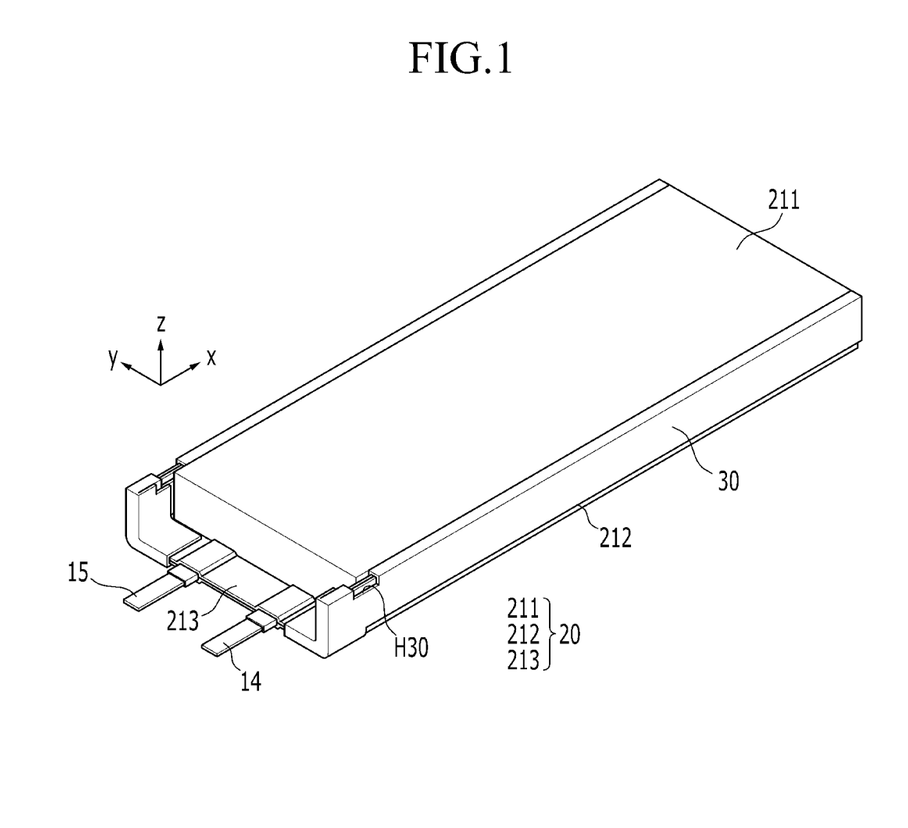
FIG. 1 is a perspective view of a pouch type rechargeable battery according to an embodiment.
Figure 2:
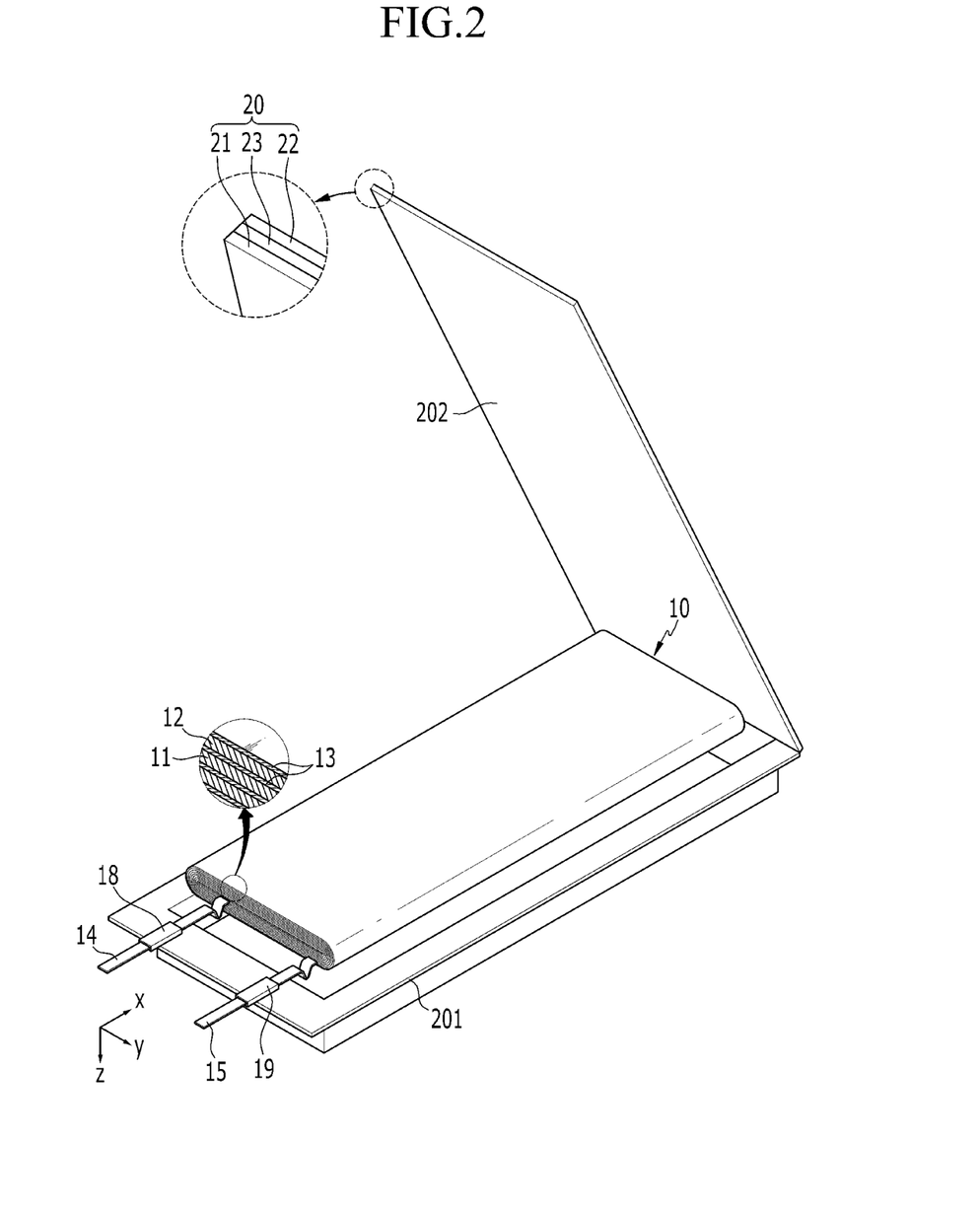
FIG. 2 is an exploded perspective view in which a pouch and an electrode assembly are separated from the pouch type rechargeable battery of FIG. 1.

FIG. 1 is a perspective view of a pouch type rechargeable battery according to an embodiment, and FIG. 2 is an exploded perspective view in which a pouch and an electrode assembly are separated from the pouch type rechargeable battery of FIG. 1.

Referring to FIG. 1 and FIG. 2, a pouch type rechargeable battery according to one embodiment includes an electrode assembly 10 performing a charging and discharging operation, a pouch 20 receiving and sealing the electrode assembly 10, and an insulation tape 30 insulating the exterior of the pouch 20.

The electrode assembly 10 is formed in a jelly-roll shape by winding a first electrode (for convenience, referred to as a positive electrode) 11 and a second electrode (for convenience, referred to as a negative electrode) 12, interposing a separator 13 therebetween. The separator 13 may be made of a polymer solid electrolyte film through which lithium ions may pass.

The positive electrode 11 includes a coated region obtained by coating an active material on a thin film current collector, and an uncoated region set as a collector that is exposed because of not being coated with the active material. A first lead tab (for convenience, referred to as a positive electrode lead tab) 14 is connected to the uncoated region of the positive electrode 11 to extend therefrom.

The negative electrode 12 includes a coated region obtained by coating an active material that is different from that of the positive electrode 11 on a thin film current collector, and an uncoated region set as a collector that is exposed because of not being coated with the active material. A second lead tab (for convenience, referred to as a negative electrode lead tab) 15 is connected to the uncoated region of the negative electrode 12 from the opposite side of the positive lead tab 14 to extend therefrom.

Figure 3:
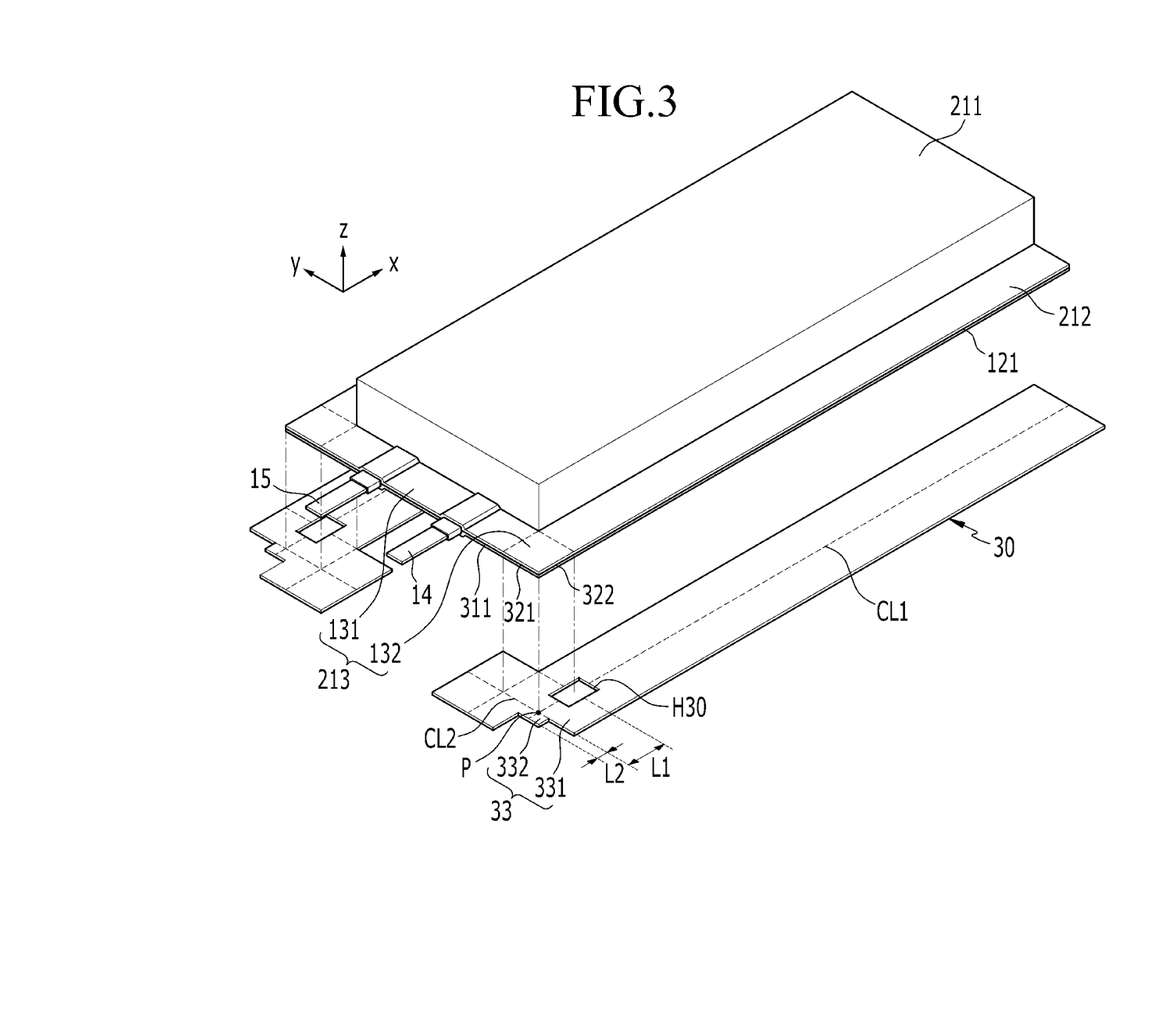
FIG. 3 is a perspective view of an arrangement of a rechargeable battery and an insulation tape before adhering the insulation tape to the pouch type rechargeable battery of FIG. 1.

FIG. 3 is a perspective view of an arrangement of a rechargeable battery and an insulation tape before adhering the insulation tape to the pouch type rechargeable battery of FIG. 1. Referring to FIG. 3, the pouch 20 includes a cell body 211, a sealing portion 212, and a terrace 213 that are predetermined according to position.

The electrode assembly 10 is substantially formed of a plane plate structure with a cuboidal shape such that the cell body 211 receiving the electrode assembly 10 is substantially formed of a plane plate structure of the cuboidal shape. The rechargeable battery encloses the electrode assembly 10 by the pouch 20 thereby entirely forming a plane plate structure of the cuboidal shape.

The sealing portion 212 is formed at a side surface (for example, a second side surface of a long edge) of the cell body 211 to be adhered to the side surface of the cell body 211. The terrace 213 is formed at the other side surface (for example, a first side surface of a short edge) of the cell body 211 to draw out the positive electrode lead tab 14 and the negative electrode lead tab 15 connected to the electrode assembly 10 to the outside. At this time, the positive electrode lead tab 14 and the negative electrode lead tab 15 may be electrically insulated from the terrace 213 by each of tab sealing members 18 and 19.

The pouch 20 may be formed in a multi-layered sheet structure that receives and seals the electrode assembly 10. For example, in a deposition direction, the pouch 20 includes a polymer sheet 21, a metal sheet 23, and a nylon sheet 22.

The polymer sheet 21 constitutes an inner surface of the pouch 20 and performs insulation and thermal fusion-bonding functions, and the nylon sheet 22 constitutes an outer surface of the pouch 20 and performs a protection function. The nylon sheet 22 may be replaced by a PET (polyethylene terephthalate) sheet, a nylon sheet, or a PET-nylon composite sheet. The metal sheet 23 provides mechanical strength and may be formed of an aluminum sheet as one example. The insulation tape 30 is adhered to the sealing portion 212 and the terrace portion 213 of the pouch 20 to insulate the side end of the metal sheet 23.

Also, in an aspect of receiving the electrode assembly 10, the pouch 20 includes a first exterior member 201 and a second exterior member 202. The first and second exterior members 201 and 202 may be formed of the polymer sheet 21, the nylon sheet 22, and the metal sheet 23 having the same structure.

The first exterior member 201 is formed of a concave structure to receive the electrode assembly 10, and the second exterior member 202 is formed of a plane structure to cover the electrode assembly 10. Also, the first and second exterior members 201 and 202 are thermal-fused at the outside receiving the electrode assembly 10 thereby forming the sealing portion 212.

The sealing portion 212 is formed by thermal-fusing the first exterior member 201 that is bent according to the electrode assembly 10 to a plane bottom surface of the second exterior member 202. The sealing portion 212 is bent from both sides of the y-axis direction into the z-axis direction and is adhered to a side surface of the cell body 211 such that the terrace 213 is formed at one side of the x-axis direction.

The insulation tape 30 insulates the sealing portion 212 and is adhered to the side surface of the cell body 211. The insulation tape 30 is adjacent to the end of the terrace 213 and includes a short circuit check hole H30. That is, the insulation tape 30 insulates both sides of the end of the terrace 213 while exposing a portion of the terrace 213 corresponding to the short circuit check hole H30.

For example, the terrace 213 includes a bottom portion 131 connected to a bottom of the cell body 211 and a side wall portion 132 bent from the bottom portion 131 and connected to the sealing portion 212 adhered to the side surface of the cell body 211. A portion of the side end of the terrace 213 is included in the bottom portion 131 and the remaining portion is included in the side wall portion 132.

Accordingly, the insulation tape 30 insulates the side end 311 of the bottom portion 131 and both side ends 321 and 322 of the side wall portion 132 in the side direction of the positive and negative electrode lead tabs 14 and 15. For example, both side ends 321 and 322 may be formed to be perpendicular to each other.

For example, the insulation tape 30 includes a first portion 31 adhered to the sealing portion 212 for insulating, a second portion 32 vertically connected to the first portion 31 and adhered to both surfaces of the bottom portion 131 for insulating, and a third portion 33 connecting the first portion 31 and the second portion 32 to each other and adhered to both surfaces of the side wall portion 132 for insulating.

The first portion 31 is adhered to both surfaces of the sealing portion 212 thereby insulating the side end 121 of the sealing portion 212. A first center line CL1 of the first portion 31 accords with the side end 121 of the sealing portion 212.

The second portion 32 is adhered to both surfaces of the bottom portion 131 thereby insulating the side end 311 of the bottom portion 131. A second center line CL2 of the second portion 32 crosses the side end 311 of the bottom portion 131.

The third portion 33 is adhered to both surfaces of the side wall portion 132 thereby insulating both side ends 321 and 322 of the side wall portion 132. A cross point P of the first center line CL1 and the second center line CL2 is positioned at the third portion 33 thereby according with the vertex of the side wall portion 132.

Also, in the third portion 33, a first distance L1 predetermined in the first center line CL1 direction between the short circuit check hole H30 and the cross point P is larger than a second distance L2 predetermined in the same direction between the cross point P and the third portion 33.

The third portion 33 is connected vertically to the first portion 31 and the second portion 32, and includes a wide width portion 331 determined as a first distance L1 and a narrow width portion 332 connected to the wide width portion 331 and the second portion 32 and that is narrower than the wide width portion 331 and being determined as a second distance L2.

Accordingly, in the terrace 213, both side ends 321 and 322 of the side wall portion 132 are insulated by the third portion 33 of the insulation tape 30. The first center line CL1 accords with the center of the short circuit check hole H30. Through the short circuit check hole H30, the side end 121 of the sealing portion 212 and the side end 322 of the side wall portion 132 are partially exposed, and thereby the short circuit check is possible.

Figure 4:
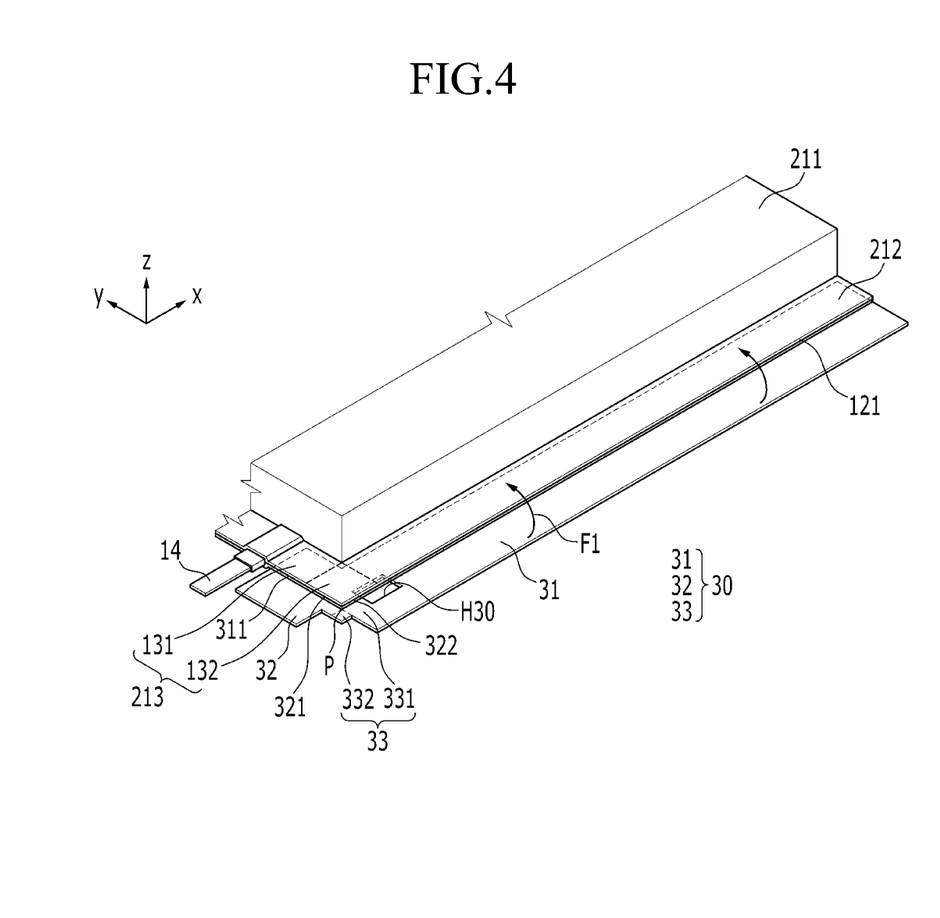
FIG. 4 is a perspective view of a state in which an insulation tape is firstly adhered to the pouch type rechargeable battery of FIG. 3.

Next, referring to FIG. 4 to FIG. 9, a process of forming the insulation structure of the pouch 20 by adhering and bending the insulation tape 30 will be described. FIG. 4 is a perspective view of a state in which an insulation tape is firstly adhered to the pouch type rechargeable battery of FIG. 3, and FIG. 5 is a partial top plan view of FIG. 4.

Figure 5:
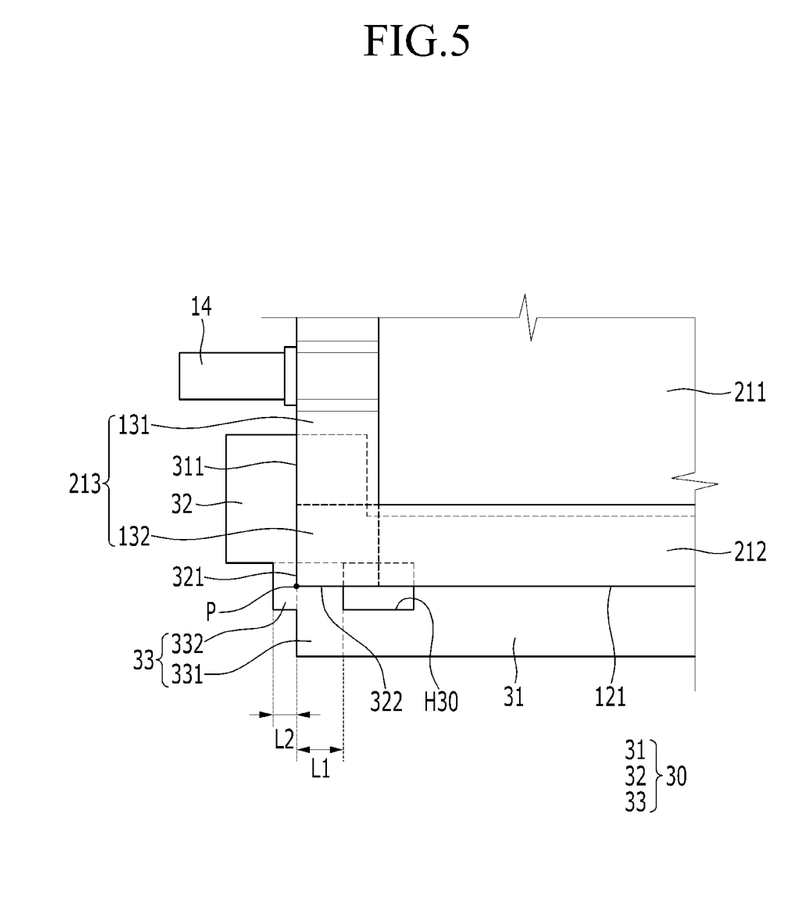
FIG. 5 is a partial top plan view of FIG. 4.

Referring to FIG. 4 and FIG. 5, the insulation tape 30 is adhered to one surface (a lower surface) of the sealing portion 212 and the terrace 213 of the pouch 20. The inside of the first center line CL1 of the first portion 31 and the inside of the second center line CL2 of the second portion 32 are respectively adhered to the sealing portion 212 and the terrace 213.

The third portion 33 of the insulation tape 30 is adhered to one surface (a lower surface) of the side wall portion 132, and the vertex of the side wall portion 132 accords with the cross point P of the third portion 33. Accordingly, the third portion 33 is adhered to the other surface (an upper surface) of the side wall portion 132 thereby realizing a state of being capable of insulating the side ends 321 and 322.

Figure 6:
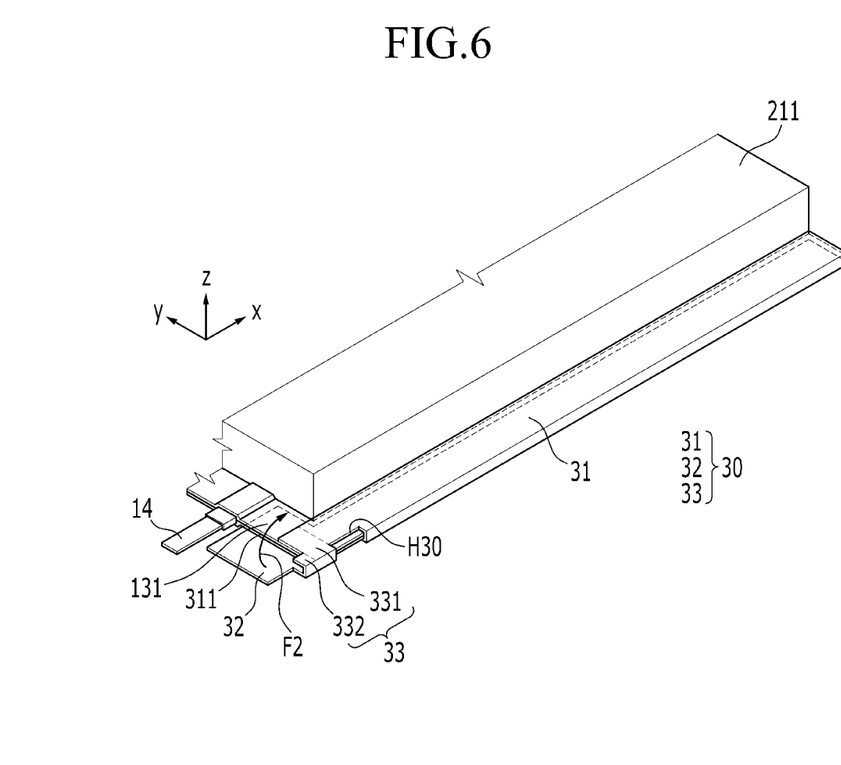
FIG. 6 is a perspective view of a state in which an insulation tape is firstly bent in the pouch type rechargeable battery of FIG. 4 and is secondly adhered.
Figure 7:
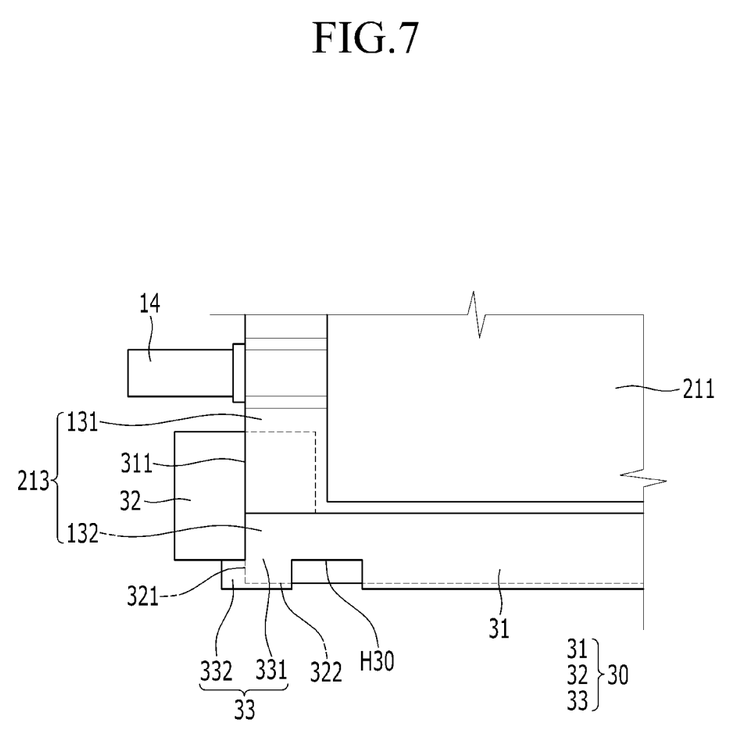
FIG. 7 is a partial top plan view of FIG. 6.

FIG. 6 is a perspective view of a state in which an insulation tape is firstly bent in the pouch type rechargeable battery of FIG. 4 and is secondly adhered, and FIG. 7 is a partial top plan view of FIG. 6.

Referring to FIG. 6 and FIG. 7, in the state of FIG. 4 and FIG. 5, if the insulation tape 30 is firstly bent (in a direction F1 of FIG. 4), the first portion 31 insulates the side end 121 of the sealing portion 212 and is adhered to the other surface (an upper surface) of the sealing portion 212.

The wide width portion 331 and the narrow width portion 332 of the third portion 33 of the insulation tape 30 are bent in the side end 322 of the side wall portion 132 and are adhered to the upper surface of the side wall portion 132. The narrow width portion 332 is bent such that facing narrow width portions 332 are adhered to each other. Accordingly, the side end 322 of the side wall portion 132 is insulated by the third portion 33 of the insulation tape 30.

Figure 8:
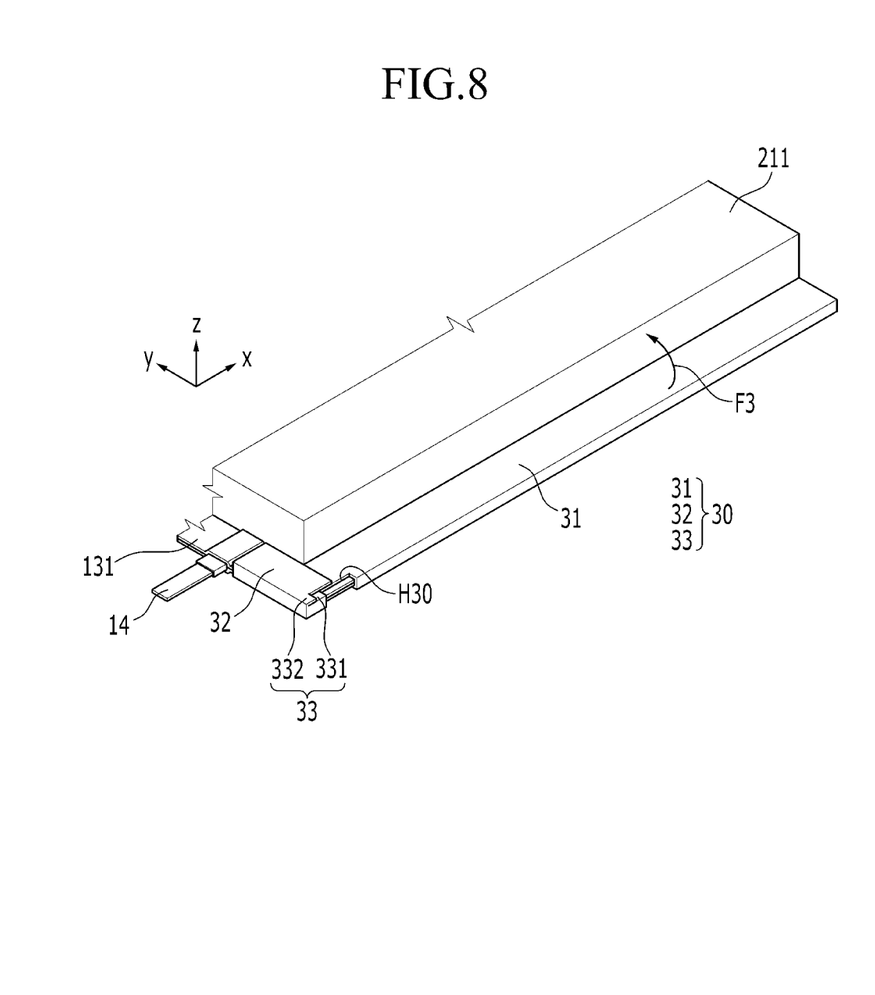
FIG. 8 is a perspective view of a state in which an insulation tape is secondly bent in the pouch type rechargeable battery of FIG. 6 and is thirdly adhered.
Figure 9:
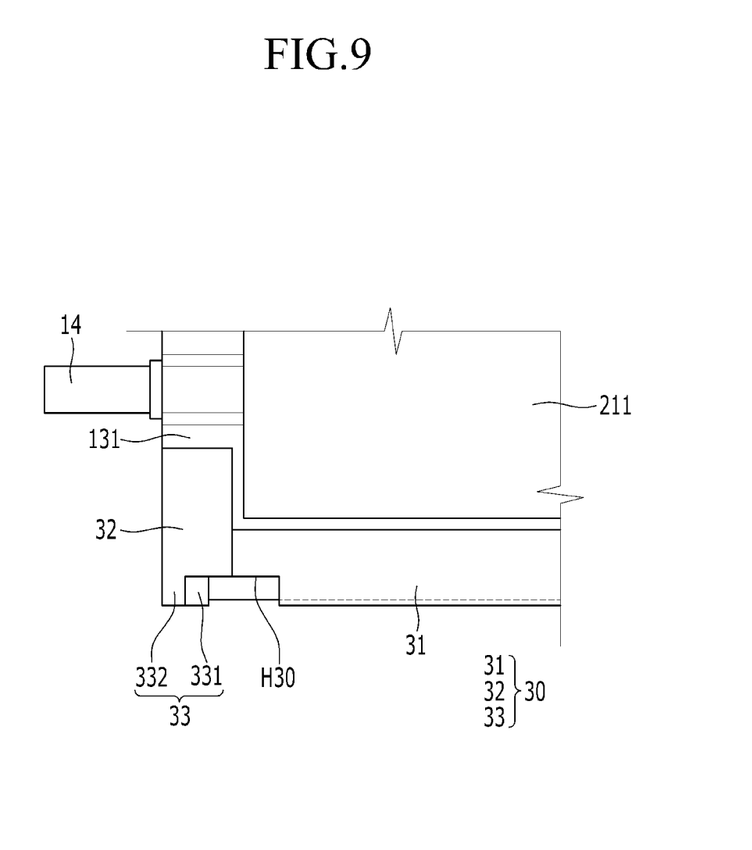
FIG. 9 is a partial top plan view of FIG. 8.

FIG. 8 is a perspective view of a state in which an insulation tape is secondly bent in the pouch type rechargeable battery of FIG. 6 and is thirdly adhered, and FIG. 9 is a partial top plan view of FIG. 8.

Referring to FIG. 8 and FIG. 9, in the state of FIG. 6 and FIG. 7, if the insulation tape 30 is secondly bent (in a direction F2 of FIG. 6), the second portion 32 insulates the side end 311 of the bottom portion 131 and the side end 321 of the side wall portion 132 and is adhered to the other surface (an upper surface) of the bottom portion 131, and the third portion 33 insulates the other side end 322 of the side wall portion 132, thereby overlapping and being adhered to the other surface (an upper surface) of the side wall portion 132.

In the third portion 33, the narrow width portion 332 has a distance L2 such that an overlap is formed within a distance L1 range of the wide width portion 331. That is, a portion of the wide width portion 331 is partially exposed outside the narrow width portion 332. Accordingly, in the side wall portion 132, an unnecessary protrusion of the third portion 33 and the insulation defect may be prevented.

Further, if the sealing portion 212 adhered with the first portion 31 is thirdly bent (in a direction F3 of FIG. 8) and is adhered to the side surface of the cell body 211, the rechargeable battery of FIG. 1 is completed. The second portion 32 of the insulation tape 30 is bent in the boundary of the bottom portion 131 and the side wall portion 132, and the first portion 31 may be adhered to the side surface of the cell body 211 by interposing a double-sided adhesive tape (not shown).

While this disclosure has been described in connection with certain embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 10: electrode assembly | 11: first electrode (positive electrode) |
| 12: second electrode (negative electrode) | 13: separator |
| 14: first lead tab (positive electrode lead tab) | |
| 15: second lead tab (negative electrode lead tab) | |
| 18, 19: tab sealing members | 20: pouch |
| 21: polymer sheet | 22: nylon sheet |
| 23: metal sheet | 30: insulation tape |
| 31, 32, 33: first, second, third portions | 131: bottom portion |
| 132: side wall portion | 201, 202: first, second exterior members |
| 211: cell body | 212: sealing portion |
| 213: terrace | 311, 321, 322, 121: side ends |
| 331: wide width portion | 332: narrow width portion |
| CL1, CL2: first, second center lines | H30: short circuit check hole |
| L1, L2: first, second distances | P: cross point |

What is claimed is:

1. A rechargeable battery comprising:
an electrode assembly;
a cell body configured to receive the electrode assembly;
a pouch comprising:

a sealing portion at a first side surface of the cell body formed by sealing an outer portion thereof, and a terrace configured to draw out a first lead tab and a second lead tab connected to the electrode assembly at a second side surface of the cell body, wherein the terrace includes:

a bottom portion connected to a bottom of the cell body, and a side wall portion bent at the bottom portion and connected to the sealing portion; and an insulation tape insulating the sealing portion from the cell body and including a short circuit check hole adjacent to an end of the terrace, wherein the short circuit check hole at least partially exposes a side end of the sealing portion and a side end of the terrace, wherein the insulation tape insulates both sides of the end of the terrace, and includes a first portion insulating a side end of the sealing portion, a second portion connected vertically to the first portion and insulating a side end of the bottom portion, and a third portion connecting the first portion and the second portion to each other and insulating side ends of the side wall portion, and wherein the insulation tape is bent to insulate the side end of the sealing portion by the first portion and to insulate one side end of the side wall portion by the third portion, and is bent to insulate the side end of the bottom portion and the other side end of the side wall portion by the second portion and to insulate the side end connected to the other side end of the side wall portion by the third portion.

2. The rechargeable battery of claim 1, wherein the side wall portion of the terrace includes an end.

3. The rechargeable battery of claim 1, wherein a first center line of the first portion crosses the side end of the sealing portion, a second center line of the second portion crosses the side end of the bottom portion, and a cross point where the first center line and the second center line are extended is positioned at the third portion thereby according with a vertex of the side wall portion.

4. The rechargeable battery of claim 3, wherein the first center line crosses a center of the short circuit check hole.

5. The rechargeable battery of claim 4, wherein in the third portion, a first distance in the first center line direction between the short circuit check hole and the cross point is larger than a second distance in the direction between the ends of the cross point and the third portion.

6. The rechargeable battery of claim 4, wherein the third portion includes:

a wide width portion connected vertically to the first portion and the second portion, and a narrow width portion connected to the wide width portion and the second portion.

* * * * *